United States Patent
Wallace

(10) Patent No.: US 7,528,707 B1
(45) Date of Patent: May 5, 2009

(54) SPARE TIRE PRESSURE MONITORING SYSTEM

(76) Inventor: Raymond E. Wallace, 11810 Plum Point Dr., Houston, TX (US) 77099

( * ) Notice: Subject to any disclaimer, the term of this patent is extended or adjusted under 35 U.S.C. 154(b) by 314 days.

(21) Appl. No.: 11/642,015

(22) Filed: Dec. 20, 2006

(51) Int. Cl.
*B60C 23/00* (2006.01)

(52) U.S. Cl. .................. 340/442; 340/426.33; 340/447; 73/146.3; 200/61.22; 116/34 R

(58) Field of Classification Search .................. 340/442, 340/426.33, 454, 444, 435–436, 438, 447; 73/146.3, 146.5, 146.8; 200/61.22, 61.25; 116/34 R
See application file for complete search history.

(56) References Cited

U.S. PATENT DOCUMENTS

| | | | |
|---|---|---|---|
| 2,445,959 A | 7/1948 | Luper | |
| 3,241,112 A | 3/1966 | Linkmeyer | |
| 3,268,678 A | 8/1966 | James | |
| 3,462,735 A | 8/1969 | Hawes | |
| 4,067,376 A * | 1/1978 | Barabino | 152/418 |
| 4,256,160 A * | 3/1981 | More | 152/427 |
| 4,742,857 A | 5/1988 | Gandhi | |
| 5,025,244 A | 6/1991 | Huang | |
| 5,513,524 A * | 5/1996 | Rosenfeld | 73/146.3 |
| 5,993,133 A * | 11/1999 | Murray et al. | 414/463 |
| 6,802,569 B1 * | 10/2004 | Conard et al. | 301/5.24 |
| 6,865,931 B1 * | 3/2005 | Ziarati | 73/146.8 |

* cited by examiner

*Primary Examiner*—Benjamin C Lee
*Assistant Examiner*—Daniel Previl
(74) *Attorney, Agent, or Firm*—Donald R. Schoonover

(57) ABSTRACT

A spare tire pressure monitoring system includes a detection mechanism releasably connectable to the valve stem of a spare tire and includes a sensing device for measuring the actual air pressure contained in the spare tire, a selection mechanism for selecting an air pressure desired to be contained in the spare tire, and a transmitter unit for transmitting signals corresponding to the actual air pressure and the desired air pressure; a monitoring unit having a control mechanism, a receiving unit for receiving the signals from the transmitter unit, a display unit for displaying the desired air pressure, a discriminator mechanism for determining the difference between the desired air pressure and the actual air pressure, and an alerting mechanism that is activated when the difference between the desired air pressure and the actual air pressure varies from certain predetermined magnitudes; and an energy source.

13 Claims, 1 Drawing Sheet

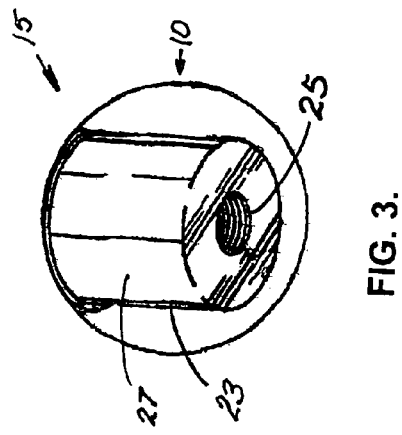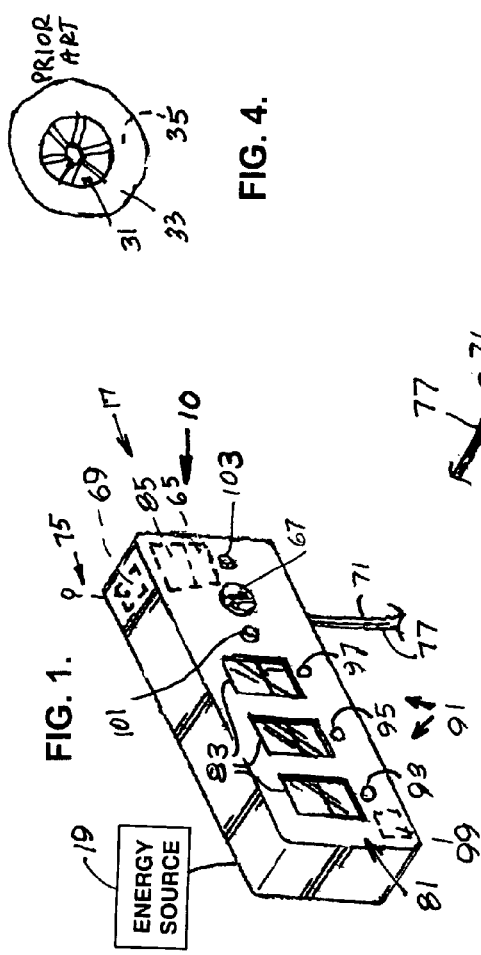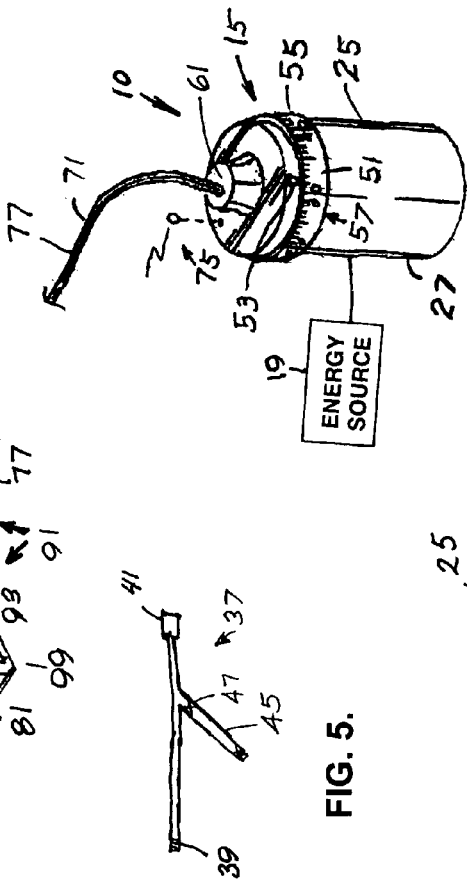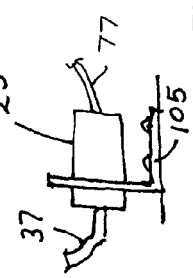

SPARE TIRE PRESSURE MONITORING SYSTEM

BACKGROUND ON THE INVENTION

1. Field of the Invention

The present invention is related to an accessory for a motor vehicle and, more particularly, to a warning and alerting apparatus for monitoring the air pressure in a spare tire of the vehicle.

2. Discussion of the Related Art

It is critical to overall safety and efficient transportation of passengers that motor vehicles be equipped with a spare tire. Spare tires allow a motorist to temporarily replace a tire that is punctured or otherwise has low air pressure. Generally, such replacements occur while on the road and in a state of emergency. Motorists who must replace an existing tire with a spare tire are cautioned by most safety standards to move their vehicle either from the main highway if possible or off onto the shoulder as much as possible. Once off the road, additional care must be taken to ensure that the replacement process is performed without injury to the motorist or to the passengers of the vehicle.

In order to feel confident that one can make a safe and adequate replacement of a damaged tire with a spare tire, it is important that the motorist keep a properly inflated and road-ready spare tire in the vehicle. Unfortunately, as with many other safety procedures such as regularly checking batteries in a smoke detector, very few people perform the simple process of checking on the readiness of the spare tire. The process generally would only involve a visual inspection of the tire and a quick application of a tire pressure gauge. Failure to take such precautionary steps can cause one to become stranded alongside the road, totally dependent upon the kindness of fellow passing motorists.

What is needed is a warning system that monitors the spare tire of a motor vehicle and alerts a user of the vehicle that the spare tire needs immediate attention due to unacceptably low air pressure in the spare tire.

The present invention is designed to alert a motorist when the air pressure in the spare tire reaches an unacceptably low level. In so doing, the present invention provides a user with an opportunity to repair or inflate the spare tire to a safe pressure. By so doing, the motorist would be ensured that the spare tire would be constantly available as an appropriate and usable replacement for the vehicle's other tires that might become deflated or flat during a road trip. Thus, the present invention could prove to be at least a time saver and perhaps even a life saver for the motorist and his passengers.

SUMMARY OF THE INVENTION

The improvements of the present invention for a spare tire pressure monitoring system include a detection mechanism, a monitoring unit, and an energy source for supply electrical energy to various components of the spare tire pressure monitoring system as needed.

The detection mechanism includes a sensing device for operably determining the actual air pressure contained in a spare tire; a connecting mechanism including a valve stem extension having a proximal end for releasable connection to, and for operably establishing fluid communication with, the sensing device, a distal end for releasable connection to the valve stem of the spare tire and to establish fluid communication with the air contained in the spare tire, and a branch having a one-way valve for permitting air to be injected into the spare tire without disconnecting the valve stem extension from the sensing device and from the valve stem of the spare tire.

The detection mechanism also includes a selection mechanism for enabling a user to select an air pressure desired to be contained in the spare tire wherein the selection mechanism includes a pointer and a rotatable annular dial having indicia arranged peripherally thereon, and wherein the selection mechanism is remotely controllable.

The detection mechanism further includes a transmitter unit for responsively transmitting first signals corresponding to the magnitude of the actual air pressure contained in the spare tire and for responsively transmitting second signals corresponding to the magnitude of the desired air pressure.

The monitoring unit includes a control mechanism, a control device for selectively and remotely controlling the selection mechanism, a receiving unit connected in communication with the control mechanism for responsively receiving the first and second signals transmitted by the transmitter unit, a communication link operably connecting the receiving unit to the transmitter unit, and operably connecting the control device to the selection mechanism, a display unit connected in communication with the control mechanism and structured to display the magnitude of the desired air pressure wherein the display unit includes at least one LCD output device, a discriminator mechanism connected in communication with the control mechanism for determining the difference between the magnitude of the desired air pressure and the magnitude of the actual air pressure in the spare tire, and an alerting mechanism connected in communication with the control mechanism which is activated by the control mechanism when the difference between the magnitude of the desired air pressure and the magnitude of the actual air pressure in the spare tire as determined by the discriminator mechanism varies from a predetermined magnitude.

The alerting mechanism includes a first optical indicator which is activated by the control mechanism when the discriminator mechanism determines that the difference between the magnitude of the desired air pressure and the magnitude of the actual air pressure in the spare tire is less than a first predetermined amount, a second optical indicator which is activated by the control mechanism when the discriminator mechanism determines that the difference between the magnitude of the desired air pressure and the magnitude of the actual air pressure in the spare tire equals or exceeds a second predetermined amount wherein the second predetermined amount is greater than the first predetermined amount, a third optical indicator which is activated by the control mechanism when the discriminator mechanism determines that the difference between the magnitude of the desired air pressure and the magnitude of the actual air pressure in the spare tire equals or exceeds a third predetermined amount wherein the third predetermined amount is greater than the second predetermined amount, and an audio generator which is activated by the control mechanism when the discriminator mechanism determines that the difference between the magnitude of the desired air pressure and the magnitude of the actual air pressure in the spare tire equals or exceeds a fourth predetermined amount.

PRINCIPAL OBJECTS AND ADVANTAGES OF THE INVENTION

The principal objects of the invention include: providing an apparatus and method that monitors the air pressure in the spare tire of a vehicle; providing such an apparatus and method that alerts the user of a vehicle that the air pressure in the spare tire of a vehicle is at an unacceptably low level; and generally providing such an apparatus and method that is reliable in performance, capable of long lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 1 is a perspective view of a monitoring unit of a spare tire pressure monitoring system in accordance with the present invention.

FIG. 2 is a perspective view of a detection mechanism of the spare tire pressure monitoring system of the present invention.

FIG. 3 is an enlarged bottom perspective view of the detection mechanism of the spare tire pressure warning system shown in FIG. 2.

FIG. 4 is a reduced plan view of a prior art spare tire and stem valve.

FIG. 5. is a plan view of a valve stem extension of the spare tire pressure monitoring system.

FIG. 6. is an alternative arrangement of a selection mechanism of the spare tire pressure monitoring system.

FIG. 7 is a side elevational view of a bracket for mounting the detection mechanism of the spare tire pressure monitoring system according to the present invention.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a spare tire pressure monitoring system that comprises an electronic detection and communication system having several, integrally connected components in accordance with the present invention, as shown in FIGS. 1 through 7. The spare tire pressure monitoring system 10 generally includes a detection mechanism 15, a monitoring unit 17, and an energy source 19 structured to supply electrical energy to various components of the spare tire pressure monitoring system 10 as needed.

The detection mechanism 15 includes a sensing device 25 that is structured to operably measure the actual gauge air pressure contained in a tire. The detection mechanism 15 also includes a connecting mechanism 27 structured to be releasably connectable to a valve stem 31 of a spare tire 33 and to establish fluid communication with the air 35 contained in the spare tire 33, as shown in FIG. 4.

The connecting mechanism 27 may include a valve stem extension 37 having a proximal end 39 structured to be releasably connectable to, and to operably establish fluid communication with, the sensing device 25, and a distal end 41 structured to be releasably connectable to the valve stem 31 of the spare tire 33 and to establish fluid communication with the air 35 contained in the spare tire 33.

The valve stem extension 37 may include a branch 45 having a one-way valve 47 that permits air to be injected into the spare tire 33 without disconnecting the valve stem extension 37 from the sensing device 25 or from the valve stem 31 of the spare tire 33.

The detection mechanism 15 may include a selection mechanism 51 structured to enable a user to select an air pressure desired to be contained in the spare tire 33. The selection mechanism 51 may include a pointer 53 and a rotatable annular dial 55 having indicia 57 arranged peripherally thereon, as shown in FIG. 2, wherein the pointer 53 and the dial 55 are structured to cooperatively enable a user to select a desired air pressure to be contained in the spare tire 33.

Alternatively, the selection mechanism 51 may include a slidable pointer 58 and a linear scale 59 having indicia 60 thereon, as shown in FIG. 6, which are structured to cooperatively enable a user to select an air pressure desired to be contained in the spare tire 33.

Preferably, the selection mechanism 51 is an integral part of the sensing device 25 as just described. In that event, the selection mechanism 51 may be remotely controllable as hereinafter described, such as by a servomechanism mounted in the monitoring unit 17 for example. Alternatively, the selection mechanism 51 may be an integral part of the monitoring unit 17 as hereinafter described.

The detection mechanism 15 includes a transmitter unit 61 structured to responsively transmit first signals corresponding to the magnitude of the actual air pressure contained in the spare tire 33 as determined by the sensing device 25. If the selection mechanism 51 is an integral part of the sensing device 26, the transmitter unit 61 is also structured to transmit second signals corresponding to the magnitude of the desired air pressure selected by the selection mechanism 51, such as by means of an encoder for example.

The monitoring unit 17 includes a control mechanism 65, such as a microprocessor, that is structured to communicate with and control the various components of the spare tire pressure monitoring system 10. If the selection mechanism 51 is an integral part of the detection mechanism 15, the monitoring unit 17 includes a control device 67 structured to selectively and remotely control the selection mechanism 51.

The monitoring unit 17 includes a receiving unit 69 structured to responsively receive the first signals, and to also receive the second signals if the selection mechanism 51 is an integral part of the detection mechanism 15, transmitted by the transmitter unit 61.

A communication link 71 operably connects the receiving unit 69 to the transmitter unit 61 and, if appropriate, also operably connects the control device 67 to the selection mechanism 51. For various applications of the present invention, the communication link 71 may be by wireless transmission as indicated by the dashed lines designated bu numeral 75 in FIGS. 1 and 2, conductor harness 77, or both.

The monitoring unit 17 also includes a display unit 81 structured to display the magnitude of the desired air pressure as selectively established by the user via the selection mechanism 51. For example, the display unit 81 may include one or more LCD output devices 83.

The monitoring unit 17 also includes a discriminator mechanism 85 structured to determine the difference between the magnitude of the desired air pressure as set by the selection mechanism 51 and the magnitude of the actual air pressure in the spare tire 33 as measured by the sensing device 25.

The monitoring unit 17 also includes an alerting mechanism 91 structured to be activated by the control mechanism 65 when the difference between the magnitude of the desired air pressure and the magnitude of the actual air pressure in the spare tire 33 as determined by the discriminator mechanism 85 varies from certain predetermined magnitudes. The alerting mechanism 91 generally includes a first optical indicator 93 such as a green light emitter for example, a second optical indicator 95 such as a yellow light emitter for example, and a third optical indicator 97 such as a red light emitter for example.

The first optical indicator 93 is activated when the discriminator mechanism 85 determines that the difference between the magnitude of the desired air pressure and the magnitude of the actual air pressure in the spare tire 33 is less than a first predetermined amount, five pounds per square inch of pressure for example; the second optical indicator 95 is activated when the discriminator mechanism 85 determines that the difference between the magnitude of the desired air pressure and the magnitude of the actual air pressure in the spare tire 33 equals or exceeds a second predetermined amount that is greater than the first predetermined amount, ten pounds per square inch of pressure for example; and the third optical indicator 97 is activated when the discriminator mechanism 85 determines that the difference between the magnitude of the desired air pressure and the magnitude of the actual air pressure in the spare tire 33 equals or exceeds a third predetermined amount wherein the third predetermined amount is greater than the second predetermined amount, fifteen pounds per square inch of pressure for example.

Preferably, the alerting mechanism 91 also includes an audio generator 99 which is activated and emits an audible warning sound after the discriminator mechanism 85 determines that the difference between the magnitude of the desired air pressure and the magnitude of the actual air pressure in the spare tire 33 equals or exceeds a certain predetermined amount, ten pounds per square inch of pressure for example. In addition, the system 10 is structured to operably activate the optical indicators 93-97 and the audio generator 99 for a short interval each time the vehicle is started to assure the user that the system 10 is operational and properly monitoring the air pressure in the spare tire 33.

The monitoring unit 17 may include a test button 101 that activates the optical indicators 93-97 and the audio generator 99 while the button 101 is depressed. If necessary, the monitoring unit 17 may also include a reset button 103 to reset the display unit 81 after the selection mechanism 51 is adjusted and/or if air has been added to the spare tire 33.

Preferably, the monitoring unit 17 is mounted in the dash area of the vehicle where it is readily observable by the operator of the vehicle. The detection mechanism 15 is mounted in the vicinity of the spare tire 33, such as with a bracket 101 as shown in FIG. 7.

In an application of the present invention, a bracket, such as bracket 105 as shown in FIG. 7, is used to rigidly mount the detection mechanism 15 to the vehicle in the vicinity of the spare tire 33. The proximal end 39 of the valve stem extension 37 is connected to form a fluid-tight seal with the sensing device 25, and the distal end 41 of the valve stem extension 37 is connected to form a fluid-tight seal with the valve stem 31 of the spare tire 33. The transmitter unit is connected to the electrical system of the vehicle.

The monitoring unit 17 is mounted in the vehicle where it is readily observable by the vehicle operator. The control mechanism 65 is connected to the electrical system of the vehicle. While the vehicle is being operated, the first optical indicator 93 remains activated, preferably glowing green, as the difference between the magnitude of the desired air pressure and the magnitude of the actual air pressure in the spare tire remains within acceptable limits, i.e., at an inflation where the spare tire could be safely used in place of one of the other tires of the vehicle.

When the actual air pressure in the spare tire drops to a pressure wherein safety might be marginal if it became necessary to use the spare tire for its intended purpose, the first optical indicator 93 is inactivated and the second optical indicator 95 is activated, preferably glowing yellow.

When the actual air pressure in the spare tire drops to a pressure wherein use of the spare tire could be very hazardous, the third optical indicator 97 is activated, preferably glowing red.

When the actual air pressure in the spare tire drops to a certain predetermined pressure, which could be the same pressure that activates the second or third optical indicators 95, 97 or any other predetermined pressure for that matter, the audio generator 99 is activated.

It is to be understood that while certain forms of the present invention have been illustrated and described herein, it is not to be limited to the specific forms or arrangement of parts described and shown.

What is claimed and desired to be covered by Letters Patent is:

1. A spare tire pressure monitoring system, comprising:
   (a) a detection mechanism including:
      (1) a connecting mechanism structured to be releasably connectable to a valve stem of a spare tire and to establish fluid communication with air contained in the spare tire,
      (2) a selection mechanism structured to enable a user to select a desired air pressure to be contained in the spare tire,
      (3) a sensing device structured to operably measure air pressure contained in the spare tire, and
      (4) a transmitter unit structured to responsively transmit first signals corresponding to the air pressure contained in the spare tire and second signals corresponding to the desired air pressure;
   (b) a monitoring unit including:
      (1) a control mechanism,
      (2) a receiving unit connected in communication with the control mechanism and structured to responsively receive the first and second signals transmitted by the transmitter unit,
      (3) a communication link operably connecting the receiving unit to the transmitter unit,
      (4) a display unit connected in communication with the control mechanism and structured to display the desired air pressure,
      (5) a discriminator mechanism connected in communication with the control mechanism and structured to determine the difference between the desired air pressure and the air pressure contained in the spare tire, and
      (6) an alerting mechanism connected in communication with the control mechanism, the alerting mechanism being activated by the control mechanism when the difference, between the desired air pressure and the actual air pressure contained in the spare tire, as determined by the discriminator mechanism, varies from a certain predetermined amount; and
   (c) an energy source structured to supply electrical energy to various components of the spare tire pressure monitoring system as needed.

2. A spare tire pressure monitoring system as described in claim 1, further comprising the connecting mechanism including a valve stem extension having a proximal end and a distal end wherein:

(a) the proximal end is structured to be releasably connectable to, and to operably establish fluid communication with, the sensing device; and (b) the distal end is structured to be releasably connectable to the valve stem of the spare tire and to establish fluid communication with the air contained in the spare tire.

3. A spare tire pressure monitoring system as described in claim 2, wherein the valve stem extension includes a branch having a one-way valve that permits air to be injected into the spare tire without disconnecting the valve stem extension from the sensing device and from the valve stem of the spare tire.

4. A spare tire pressure monitoring system as described in claim 1, wherein the selection mechanism includes a pointer and a rotatable annular dial having indicia arranged peripherally thereon, the pointer and dial being structured to cooperatively enable a user to select a desired air pressure to be contained in the spare tire.

5. A spare tire pressure monitoring system as described in claim 1, wherein the selection mechanism includes a slidable pointer and a linear scale having indicia thereon which are structured to cooperatively enable a user to select a desired air pressure to be contained in the spare tire.

6. A spare tire pressure monitoring system as described in claim 1, wherein:
   (a) the selection mechanism is remotely controllable;
   (b) the control mechanism includes a control device structured to selectively and remotely control the selection mechanism; and
   (c) the communication link operably connects the control device to the selection mechanism.

7. A spare tire pressure monitoring system as described in claim 1, wherein the display unit includes at least one LCD output device structured to display the desired air pressure to be contained in the spare tire as selectively established by the user via the selection mechanism.

8. A spare tire pressure monitoring system as described in claim 7, wherein the alerting mechanism includes a second optical indicator which is activated by the control mechanism when the discriminator mechanism determines that the difference between the desired air pressure and the air pressure contained in the spare tire equals or exceeds a second predetermined amount wherein the second predetermined amount is greater than the first predetermined amount.

9. A spare tire pressure monitoring system as described in claim 8, wherein the first optical indicator emits a green light, the second optical indicator emits a yellow light, and the third optical indicator emits a red light.

10. A spare tire pressure monitoring system as described in claim 1, wherein the alerting mechanism includes a first optical indicator which is activated by the control mechanism when the discriminator mechanism determines that the difference between the desired air pressure and the air pressure contained in the spare tire is less than a first predetermined amount.

11. A spare tire pressure monitoring system as described in claim 10, wherein the alerting mechanism includes a third optical indicator which is activated by the control mechanism when the discriminator mechanism determines that the difference between the desired air pressure and the actual air pressure contained in the spare tire equals or exceeds a third predetermined amount wherein the third predetermined amount is greater than the second predetermined amount.

12. A spare tire pressure monitoring system as described in claim 1, wherein the alerting mechanism includes an audio generator which is activated by the control mechanism when the discriminator mechanism determines that the difference between the desired air pressure and the air pressure contained in the spare tire equals or exceeds a certain predetermined amount.

13. A spare tire pressure monitoring system, comprising:
   (a) a detection mechanism including:
      (1) a sensing device structured to operably determine air pressure contained in a spare tire, and
      (2) a connecting mechanism including a valve stem extension having:
         (A) a proximal end structured to be releasably connectable to, and to operably establish fluid communication with, the sensing device,
         (B) a distal end structured to be releasably connectable to the valve stem of the spare tire and to establish fluid communication with air contained in the spare tire, and
         (C) a branch having a one-way valve, the branch being structured to permit air to be injected into the spare tire without disconnecting the valve stem extension from the sensing device and from the valve stem of the spare tire;
      (3) a selection mechanism structured to enable a user to select a desired air pressure to be contained in the spare tire, the selection mechanism including a pointer and a rotatable annular dial having indicia arranged peripherally thereon, the pointer and dial being structured to cooperatively enable a user to select the desired air pressure, the selection mechanism being remotely controllable, and
      (4) a transmitter unit structured to responsively transmit first signals corresponding to the air pressure contained in the spare tire and second signals corresponding to the desired air pressure;
   (b) a monitoring unit including:
      (1) a control mechanism including a control device structured to selectively and remotely control the selection mechanism,
      (2) a receiving unit connected in communication with the control mechanism and structured to responsively receive the first and second signals transmitted by the transmitter unit,
      (3) a communication link operably connecting the receiving unit to the transmitter unit, and operably connecting the control device to the selection mechanism,
      (4) a display unit connected in communication with the control mechanism and structured to display the desired air pressure, the display unit including at least one LCD output device structured to display the desired air pressure,
      (5) a discriminator mechanism connected in communication with the control mechanism and structured to determine the difference between the desired air pressure and the air pressure contained in the spare tire, and
      (6) an alerting mechanism connected in communication with the control mechanism, the alerting mechanism being activated by the control mechanism when the difference between the desired air pressure and the air pressure contained in the spare tire, as determined by the discriminator mechanism, varies from a predetermined magnitude, the alerting mechanism including:
         (A) a first optical indicator which is activated by the control mechanism when the discriminator mechanism determines that the difference between the desired air pressure and the air pressure contained in the spare tire is less than a first predetermined amount, (B) a second optical indicator which is activated by the control mechanism when the discriminator mechanism determines that the difference between the desired air pressure and the air pressure contained in the spare tire equals or exceeds a second predetermined amount wherein the second predetermined amount is greater than the first predetermined amount, (C) a third optical indicator which is activated by the control mechanism when the discriminator mechanism determines that the difference between the desired air pressure and the air pressure contained in the spare tire equals or exceeds a third predetermined amount wherein the third predetermined amount is greater than the second predetermined amount, and (D) an audio generator which is activated by the control mechanism when the discriminator mechanism determines that the difference between the desired air pressure and the air pressure contained in the spare tire equals or exceeds a fourth predetermined amount; and (c) an energy source structured to supply electrical energy to various components of the spare tire pressure monitoring system as needed.

* * * * *